(12) United States Patent
Brondex et al.

(10) Patent No.: US 9,837,875 B2
(45) Date of Patent: Dec. 5, 2017

(54) INDUCTION MOTOR CAPABLE OF BEING HOUSED IN A TUBULAR ACTUATOR AND METHOD OF ASSEMBLING THIS MOTOR

(71) Applicant: SOMFY SAS, Cluses (FR)

(72) Inventors: Adrien Brondex, Domancy (FR); Vincent Lanfroy, Cran Gevrier (FR)

(73) Assignee: SOMFY SAS, Cluses (FR)

( * ) Notice: Subject to any disclaimer, the term of this patent is extended or adjusted under 35 U.S.C. 154(b) by 356 days.

(21) Appl. No.: 14/350,302

(22) PCT Filed: Oct. 5, 2012

(86) PCT No.: PCT/FR2012/052270
§ 371 (c)(1),
(2) Date: Apr. 7, 2014

(87) PCT Pub. No.: WO2013/050723
PCT Pub. Date: Apr. 11, 2013

(65) Prior Publication Data
US 2014/0327344 A1    Nov. 6, 2014

(30) Foreign Application Priority Data

Oct. 6, 2011 (FR) ...................... 11 59040

(51) Int. Cl.
*H02K 7/14* (2006.01)
*H02K 7/00* (2006.01)
(Continued)

(52) U.S. Cl.
CPC .............. *H02K 7/14* (2013.01); *H02K 5/15* (2013.01); *H02K 7/003* (2013.01); *H02K 17/16* (2013.01); *Y10T 29/49009* (2015.01)

(58) Field of Classification Search
CPC .......... H02K 17/16; H02K 5/15; H02K 7/003; H02K 7/14; Y10T 29/49009
(Continued)

(56) References Cited

U.S. PATENT DOCUMENTS

| 2,462,204 A * | 2/1949 | Ludwig ................ H02K 5/15 |
| | | 310/405 |
| 5,945,759 A * | 8/1999 | Tanaka ................ H02K 5/15 |
| | | 310/49.01 |

(Continued)

FOREIGN PATENT DOCUMENTS

| DE | 4139984 A1 | 6/1993 |
| EP | 0184724 A2 | 6/1986 |

(Continued)

OTHER PUBLICATIONS

International Search Report dated Nov. 26, 2012 re: PCT/FR2012/052269; citing: US 2010/244602 A1, Ep 1 345 307 A2, EP 0 406 431 A1 and EP 0 410 933 A1.

(Continued)

*Primary Examiner* — Alex W Mok
(74) *Attorney, Agent, or Firm* — Cantor Colburn LLP

(57) ABSTRACT

Induction motor capable of being housed in a tubular actuator and method of assembling this motor. This motor (1) comprises: (i) a stator (2), (ii) a rotor assembly, (iii) a bowl (9) capable of protecting a bundle formed at one end (7) of the stator (2), the bowl (9) comprising an internal skirt (13), (iv) means of supporting the rotor assembly allowing the rotor assembly to rotate with respect to the stator (2), the support means comprising a bearing (21) positioned inside the internal skirt (13), the bearing (21) comprising a region that rests twice, axially and radially, against the stator (2).

13 Claims, 4 Drawing Sheets

(51) Int. Cl.
*H02K 5/15* (2006.01)
*H02K 17/16* (2006.01)

(58) Field of Classification Search
USPC .................................. 310/67 R, 90; 29/596
See application file for complete search history.

(56) References Cited

U.S. PATENT DOCUMENTS

| | | | | | |
|---|---|---|---|---|---|
| 6,700,253 | B1* | 3/2004 | Ohnuma | .................. | H02K 5/08 310/33 |
| 2001/0010439 | A1* | 8/2001 | Klingler | ................ | F16H 57/025 310/99 |
| 2002/0074893 | A1* | 6/2002 | Masuda | .................. | H02K 5/15 310/402 |
| 2005/0006960 | A1* | 1/2005 | Matsushita | ............ | H02K 1/145 310/49.08 |
| 2005/0236914 | A1* | 10/2005 | Horiike | .................. | H02K 1/145 310/49.07 |
| 2007/0272472 | A1* | 11/2007 | Matsubara | ............... | H02K 5/15 180/444 |
| 2008/0054747 | A1* | 3/2008 | Helmi | ...................... | H02K 5/15 310/90 |
| 2010/0133935 | A1* | 6/2010 | Kinugawa | ................ | H02K 3/50 310/89 |
| 2010/0176673 | A1* | 7/2010 | Wright | .................... | F04D 13/06 310/88 |
| 2010/0244602 | A1 | 9/2010 | Perret et al. | | |
| 2011/0095163 | A1* | 4/2011 | Phan | ........................ | H02K 5/15 248/562 |
| 2011/0210630 | A1* | 9/2011 | Liu | .......................... | H02K 5/08 310/90 |
| 2015/0040698 | A1* | 2/2015 | Kessler | ................... | H02K 1/17 74/89 |

FOREIGN PATENT DOCUMENTS

| | | |
|---|---|---|
| EP | 0406431 A1 | 1/1991 |
| EP | 0410933 A1 | 1/1991 |
| EP | 1345307 A2 | 9/2003 |
| EP | 2237396 A1 | 10/2010 |

OTHER PUBLICATIONS

International Search Report dated May 3, 2013 re: PCT/FR2012/052270; citing: EP 2 237 396 A1, EP 0 410 933 A1, EP 0 184 724 A2 and DE 41 39 984 A1.

* cited by examiner

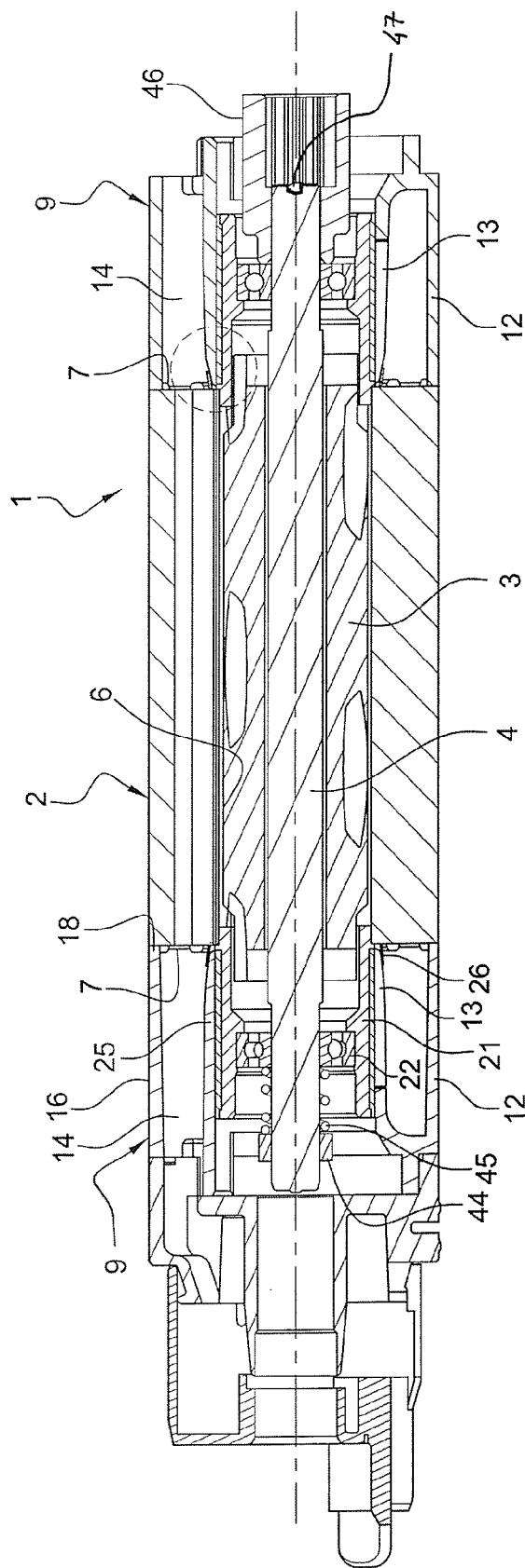
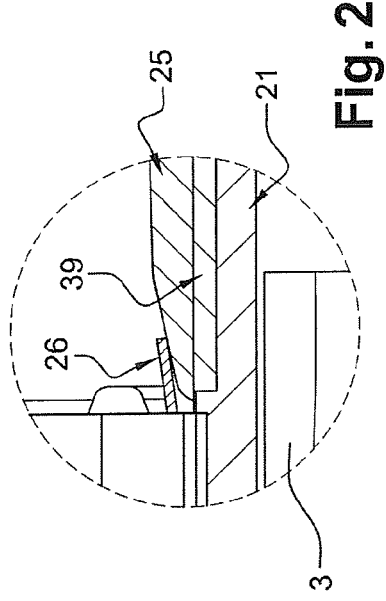

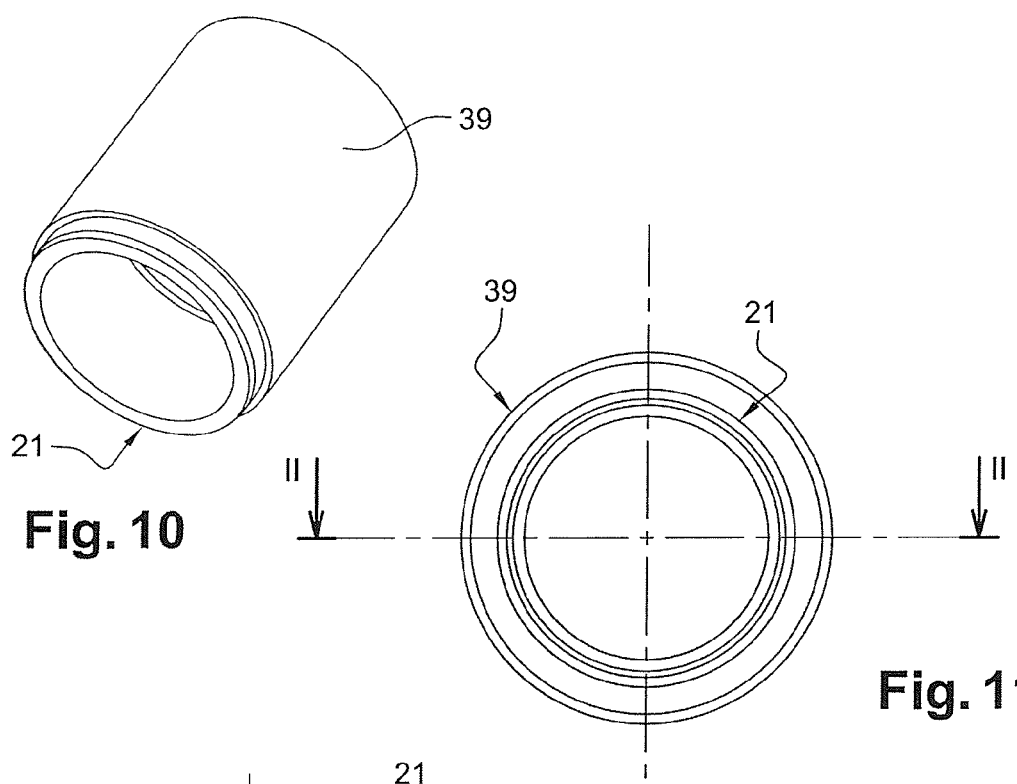
Fig. 10
Fig. 11
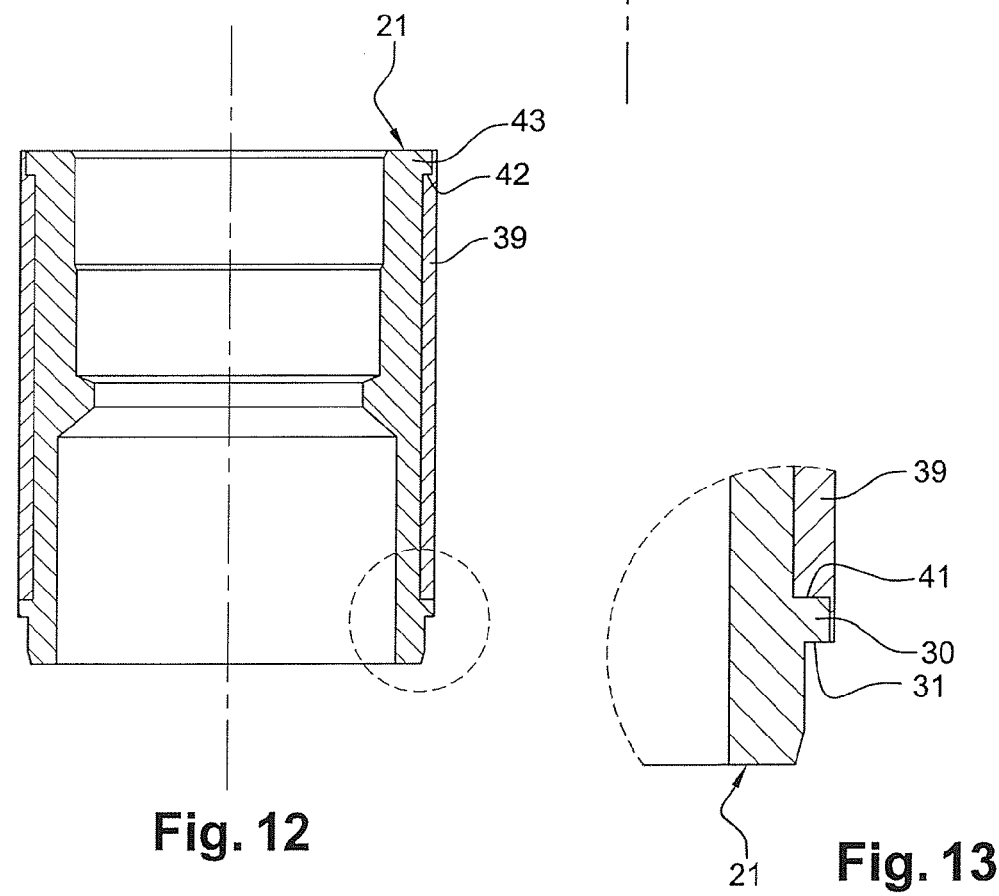
Fig. 12
Fig. 13

INDUCTION MOTOR CAPABLE OF BEING HOUSED IN A TUBULAR ACTUATOR AND METHOD OF ASSEMBLING THIS MOTOR

TECHNICAL FIELD

The present invention relates to an induction motor, to be placed inside a tubular actuator for home automation applications to be used in particular to roll up and down cloths, blinds, screens, and roller shutters, and a method of assembling such a motor.

BACKGROUND

Induction motors typically include a stator having a bore within which a rotor is disposed. The stator comprises teeth distributed uniformly over its inner wall and separated by notches. The teeth support coils, which extend into the notches. The coils allow the establishment of a rotating magnetic field causing rotation of the rotor. The assembly of the coils forms the winding.

It is desirable that the motors to be housed in actuators for home automation applications emit the least possible noise for user comfort. The noise originates from the vibrations inside the motor. The vibrations are generally caused by the clearances between the components of the motor, including rotor eccentricity in the stator bore.

Furthermore, part of the winding conventionally projects beyond the ends of the stator. These projections are called winding heads or coil ends. Their deterioration, during or after assembly, due in particular to the axial abutment of a component against the stator, may cause motor malfunction. It is, therefore, important to protect the coil ends for motor reliability. It is known to protect the coil ends, for example with a protection element which prevents their contact with the rotor shaft. However, the presence of said protection element tends to move away the bearings used to ensure the rotation of the rotor. It can therefore increase eccentricity. Other assembly restraints can maintain bearings on both sides of the protection elements.

In particular, it is known from patent document EP2237396 a tubular induction motor with two directions of rotation contained in a tube of a tubular actuator intended to be installed in a building, said motor comprising a rotor supported by bearings and a stator comprising a bundle of plates forming a central bore and centered in the tube, wherein a bearing support part is centered in the central bore, and wherein the bearing is smooth and conductive, and disposed the closest possible to a short-circuit ring of the rotor, less than 2 mm or 1 mm.

However, the bearings are arranged at a distance from the stator. However one has to keep in mind that the farther away the bearings are from the stator, the greater is the risk of rotor eccentricity. Rotor eccentricity can cause vibrations and, as a consequence, noise, during operation.

Moreover, the bearings are arranged in a bearing support part, which itself abuts against the stator. There is therefore, in addition to a clearance between the bearing support part and the stator, a clearance between the support part and the bearing it supports. This multitude of clearances in the tolerance stack-up contributes to the generation of vibrations during operation.

Furthermore, it is known from patent document EP0410933 a tubular double insulation gear motor comprising a motor consisting of a stator secured to a metal tube and a rotor driving a gearbox. It further comprises a tubular insulating casing arranged between the stator and the tube. The stator is fitted with end pieces having a portion of smaller diameter than that of the stator and around which the insulating casing is axially locked.

However, here too, the bearings of the gear motor described in patent document EP0410933 are arranged at a distance from the stator. Therefore, the distance between said two bearings is relatively large. Such a distance may cause a problem of rotor eccentricity. In operation, rotor eccentricity generates vibration and, as a result, noise.

BRIEF SUMMARY

Therefore, the present invention aims to overcome some or all of these drawbacks by providing an induction motor allowing immediate re-centering of the rotor in the stator bore to limit the intensity of the noise emitted during operation.

To this end, the present invention relates to an induction motor adapted to be housed in the hollow body of a substantially longitudinal actuator to roll up and down cloths, screens, blinds and roller shutters, characterized in that the motor comprises:
 (i) a stator,
 (ii) a rotor assembly,
 (iii) a bowl, adapted to protect a coil end formed at an end of the stator, the bowl comprising an inner skirt,
 (iv) means for supporting the rotor assembly permitting rotation of the rotor assembly relative to the stator, the support means comprising a bearing disposed within the inner skirt, the bearing comprising a zone for dual axial and radial abutment against the stator.

Thus, the induction motor according to the invention makes it possible, thanks to a dual axial and direct radial abutment between the bearing and the rotor, to reduce the tolerance stack-up between said elements and, as a consequence, clearances and associated vibrations. This results in a lower sound intensity in operation, for greater user comfort. In particular, the tolerance stack-up between the stator and the rotor comprises only the bearing stack-up, without any other intermediate element, the bearing alone providing the direct rotating contact between the rotor and stator.

According to another feature of the motor according to the invention, the bearing comprises an outer wall and the dual abutment zone is formed by the end of the outer wall of the bearing and a side of an annular rib located on the outer wall.

According to another feature of the motor according to the invention, the annular rib forms a first shoulder shaped to axially abut against the stator and defines a bearing surface shaped to radially abut against the stator.

According to yet another feature of the motor according to the invention, the support means comprises a rolling disposed within the bearing.

The rolling is used to further reduce the noise, compared to the use of a bearing alone to ensure rotation of the rotor relative to the stator. In this case, the tolerance stack-up between the stator and the rotor comprises the tolerance stack-ups of the bearing and the rolling, without any other intermediate element.

Advantageously, the bearing comprises an inner wall with a shoulder oriented to the opposite side with respect to the stator, the rolling abutting against the shoulder. The shoulder is oriented outwardly, i.e. facing outward, and not the stator.

This makes it possible to mount the rolling from the outside inwardly, i.e. in the direction of the stator.

Advantageously, the motor comprises means for restraining the rolling towards the shoulder.

It can be a driver tightly mounted on the rotor shaft and abutting against the rolling or a ring secured to the shaft on which a pre-stressed spring abuts, pressing the rolling against the shoulder. The objective of these restraining means is to remove the clearance in the rolling and hold the bearings against the stator.

According to one embodiment, the restraining means comprises a bearing element secured to a rotor shaft and biasing means tending to press the rolling against the shoulder.

According to one embodiment, the rotor comprises a rotor assembly extending at least partially inside the bearing.

Advantageously, the motor comprises an electrically insulating element interposed between the bearing and the inner skirt.

This prevents the risks of electrical contact between the coil end and an electrically conductive element, which is likely to cause a short circuit leading to a motor breakdown.

According to another feature of the motor according to the invention, the bearing comprises an outer wall covered with the electrically insulating element, and comprising a second shoulder and a third shoulder opposite to each other, against which abuts the electrically insulating element, to secure it axially relative to the bearing.

According to one embodiment, the electrically insulating element is over-molded onto the bearing.

According to another feature of the motor according to the invention, the motor comprises a second similar bearing and the two bearings are arranged symmetrically in the motor.

Advantageously, the bowl is adapted to center the stator in the hollow body of the substantially longitudinal actuator. For example, the bowl comprises an outer skirt shaped to match the shape of the inner wall of the hollow body of the longitudinal actuator, the outer skirt having an edge adapted to abut against one of the ends of the stator, the edge comprising a plurality of legs extending into the extension of the outer skirt and each housed in a recess formed on the outer circumference of the stator.

According to another aspect of the present invention, the latter relates to a method of assembling an induction motor having the above features, characterized in that it comprises the steps of disposing a bowl at each end of the stator so as to protect the coil ends of the subsequent stages of assembly, inserting in the inner skirt of one of the bowls a bearing until the bearing abuts axially and radially against the stator, setting up inside the bearing and a central bore of the stator, a rotor assembly.

Advantageously, the insertion of the bearing into the inner skirt of the bowl is made towards the stator.

The motor assembly method according to the invention may comprise a further step of:

inserting in the inner skirt of the other bowl a bearing similar to the previous bearing, until said bearing abuts axially and radially against stator.

The motor assembly method according to the invention may be such that the step of inserting the bearing comprises a step of deformation of the inner skirt of the bowl.

According to a preferred embodiment, the invention relates to a method of assembling an induction motor having the above features, characterized in that it comprises the steps of:

assembling two rollings in two corresponding bearings to form two first subassemblies each formed of a rolling and a bearing, assembling one of said first subassemblies with the rotor assembly, and optionally with a driver arranged to abut against the rolling of this first subassembly, to form a second subassembly, assembling two bowls on the stator, each bowl being arranged in abutment against one of the ends of the stator to form a third subassembly, assembling the third subassembly with the second subassembly and with the remaining first subassembly, axially prestressing the assembly thus formed.

According to one embodiment, the rotor assembly, one of the first subassembly, and optionally the driver, are pushed-in to form the second subassembly, and wherein the assembly of the third subassembly, the second subassembly and the remaining first subassembly is also formed by a simultaneous push-in operation.

According to one possibility, the method further comprises a step of positioning a guide pin of a workstation in a housing formed on the rotor axis, to perform the step of assembling the third sub-assembly with the second subassembly and the remaining first subassembly.

BRIEF DESCRIPTION OF THE DRAWINGS

These and other features of the present invention, and their advantages, will become apparent from the following description of an embodiment of an induction motor according to the invention, given by way of non-limiting example, with reference to the accompanying drawings in which:

FIG. 1 shows an induction motor according to a particular embodiment of the invention, FIG. 2 shows a detail of FIG. 1, FIGS. 3 and 4 are perspective views of a bowl fitted on an induction motor according an embodiment of the invention, FIG. 10 is a side view of an assembly comprising a bearing and an insulating element intended to be fitted on an induction motor according an embodiment of the invention, FIG. 11 is a top view of a bearing assembly comprising a bearing and an insulating element and intended to be fitted on an induction motor according an embodiment of the invention, FIG. 12 is a sectional view along line II-II of FIG. 11, FIG. 13 is a detail of FIG. 12.

DETAILED DESCRIPTION

Figure 3:
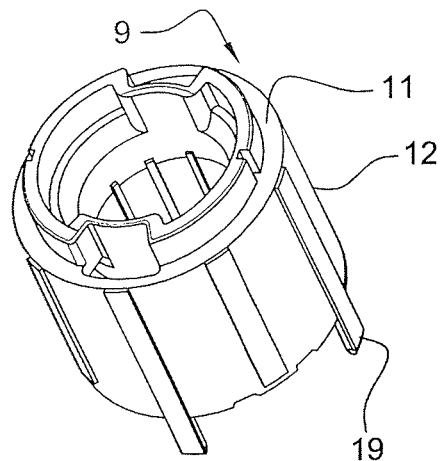

FIG. 1 shows an induction motor 1 according to a particular embodiment of the invention. The motor 1 can be a two-way rotation motor. It includes a stator 2 and a rotor assembly. The rotor assembly includes a rotor 3, for example a squirrel-cage rotor. The rotor 3 is fixed to a shaft 4.

The motor 1 is designed to be inserted in the hollow body of a substantially longitudinal actuator (not shown). Said actuator is intended to be fixed to a building, horizontally, and used in home automation applications, e.g. to roll up and down cloths, screens, blinds and roller shutters. Thus, the motor 1 is substantially tubular. In other words, the length of the stator 2 is generally greater than its outside diameter.

The stator 2 may include a bundle of plates forming a central bore 6. The rotor 3 is disposed within the central bore 6.

The stator 2 is centered in the hollow body of the longitudinal actuator.

The stator 2 comprises, on the circumference of its central bore 6, a plurality of grooves (not shown) extending axially and opening at each end 7 of the stator 2.

These grooves are also called stator slots.

The stator slots define between them the teeth (not shown) around which coils are wound. The assembly of the coils forms the winding.

A portion of the winding extends generally beyond the ends 7 of the stator 2, and form protuberances or projections called coil ends. Thus, the stator 2 has at each end 7 a coil end (not shown). To prevent motor 1 malfunction, the coil ends must be protected and insulated.

The motor 1 comprises means for protecting each coil end. In the example of FIGS. 1 to 5, the protection means include a bowl 9 forming a protective casing. The bowl 9 has a base from which an outer skirt 12 and an inner skirt 13 extend.

The outer skirt 12 and the inner skirt 13 define between them a space 14 wherein each coil end extends. The motor 1 shown in FIG. 1 comprises two bowls 9, at each end 7 of the stator 2. Both bowls 9 are similar, and are arranged symmetrically on either side of the stator 2. The bowls 9 can be made of deformable flexible or rigid insulating material. In particular, the inner skirt 13 is deformable under the action of a centrifugal radial force.

The outer skirt 12 includes a bearing 16. The bearing 16 is shaped to abut against the inner wall of the hollow body of the longitudinal actuator in which the motor 1 is to be inserted. In the embodiment shown in FIGS. 3 to 5, the outer skirt 12 has a cylindrical shape.

Opposite to the base 11, the outer skirt 12 has an edge intended to abut against one of the ends 7 of the stator 2. According to the embodiment of FIGS. 3 to 5, the edge 18 comprises a plurality of legs 19. The legs 19 extend in the extension of the outer skirt 12. Each leg 19 is shaped to be housed in a recess (not shown) formed on the outer circumference of the stator 2. Thus, the legs 19 prevent any relative radial movement between the stator 2 and each bowl 9. Furthermore, the outer skirt 12 is shaped to match the shape of the inner wall of the hollow body of the longitudinal actuator. Thus, with the outer skirt 12, the bowls 9 make it possible to center the stator 2 in the longitudinal actuator.

Each inner skirt 13 can protect a coil end during and after assembly of the motor 1. According to the embodiment illustrated in FIGS. 3 to 5, the inner skirt 13 has a frusto-conical shape. The interior of the inner skirt 13 is intended to receive means for supporting the shaft 4. The support means may include a bearing 21 and a rolling 22 (e.g. balls) which will be described in detail hereinafter.

The inner skirt 13 is intended to be deformed when the support means are installed. During assembly of the bowl 9 against the stator 2, the inner skirt 13 is in a rest position: it is not deformed, because the support means are absent. Therefore, the space 14 has a maximum opening. The maximum opening of the space 14 facilitates the installation of each bowl 9 without risk of damage to the coil end.

Figure 4:
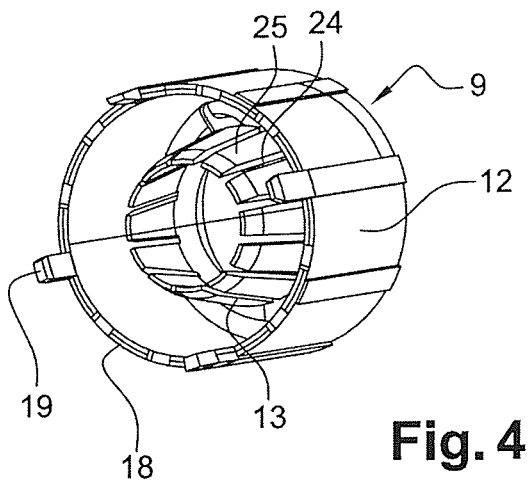
Figure 5:
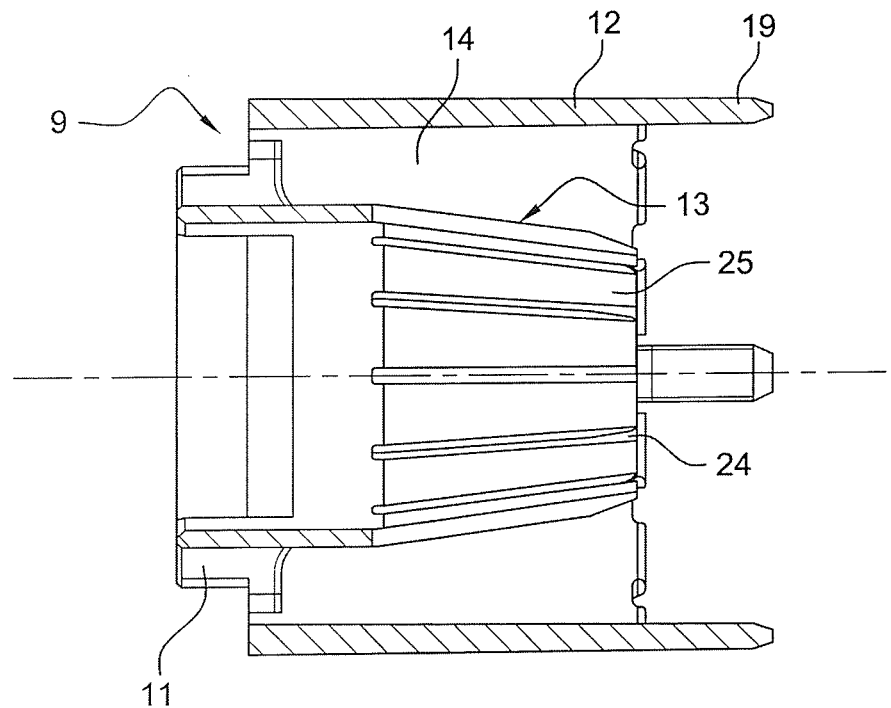
FIG. 5 is a sectional view of a bowl fitted on an induction motor according an embodiment of the invention.
Figure 6:
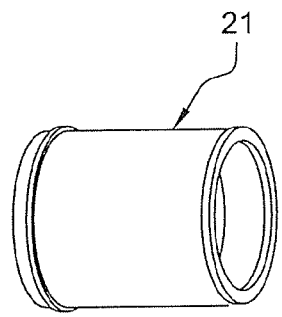
FIG. 6 is a perspective view of a bearing fitted to a an induction motor according to an embodiment of the invention.
Figure 7:
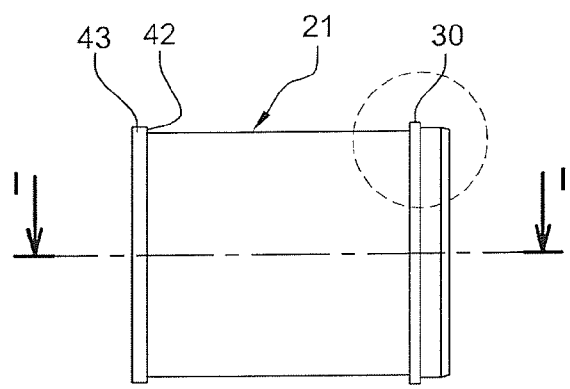
FIG. 7 is a side view of a bearing intended to be fitted on an induction motor according an embodiment of the invention.
Figure 8:
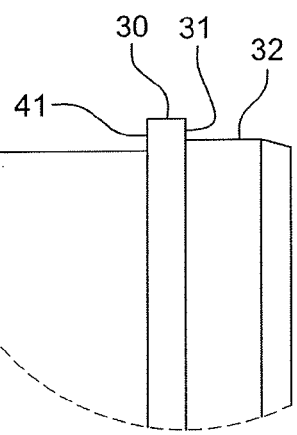
FIG. 8 is a detail of FIG. 7.
Figure 9:
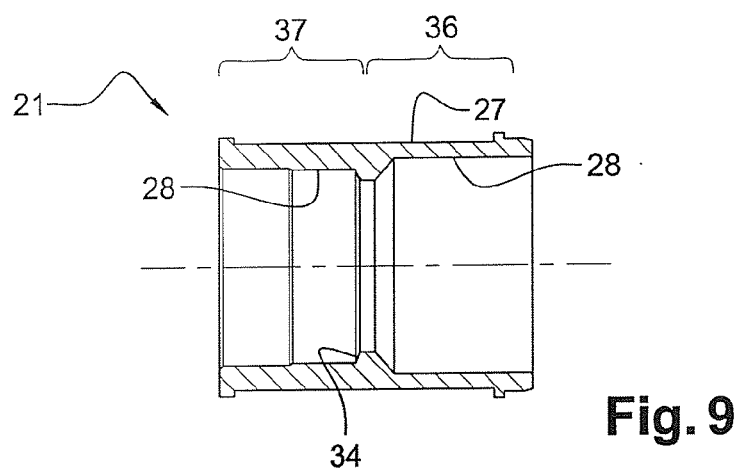
FIG. 9 is a sectional view along line I-I of FIG. 7.

As shown in FIGS. 3 to 5, the inner skirt 13 is slit in a plurality of notches 24. Two successive notches 24 define between them a tab 25.

The tabs 25 have one end linked to the base 11 and a free end. They are adapted to be deformed when the support means of the rotor assembly is inserted into the inner skirt 13. The free ends 10 of tabs 25 define a diameter edge smaller than the diameter of the central bore 6. The diameter of this edge is also smaller than the largest outside diameter of the bearing 21.

The motor 1 may include wedges 26 shown in FIG. 2, arranged at each stator end 7 and intended to be used to electrically insulate the stator. These wedges 26 should not be moved or damaged during installation (under UL and European standards).

The number of tabs 25 can be equal to the number of stator slots and the number of stator 2 teeth. Where appropriate, each tab 25 is disposed in the extension of one of the teeth of the stator 2. The risk of part of the coil end passing through one of the notches 24 and being damaged is thus diminished.

Alternatively, for the same result, the inner skirt 13 is made from plastic with shape retention memory. It is therefore intended to be deformed when the support means are installed, thereby protecting the coil ends while abutting against the bearing 21.

The motor 1 shown in FIG. 1 comprises two similar bearings 21, and two similar rollings 22. The bearings 21 and rollings 22 are placed symmetrically on either side of the stator 2. The bearings 21 are for example made from sintered metal or machined metal.

During the insertion of the bowl 9 over the coil ends, the diameter of the free end of the inner skirt 13 being smaller than the diameter of the central bore 6, the risk of axially moving the wedges 26 or damaging the coil ends is very low or nonexistent.

Each bearing 21 is then disposed within the interior of one of the skirts 13. When the bearing 21 is installed in the corresponding inner skirt 13, the latter has a substantially radial deformation. The space 14 is then restrained, but the wedges 26 and the coil end were protected during the installation of the support means. As a matter of fact, the free ends of the tabs 25 radially push the wedges 26 and the coil ends without moving them axially. Moreover, with this configuration, the support means 5 may be placed as close as possible to the stator 2 for a better guidance.

As shown in FIGS. 6 to 9, each bearing 21 can be substantially cylindrical in shape. Each bearing 21 includes an outer wall 27 and an inner wall 28.

The outer wall 27 comprises an annular rib 30. The annular rib 30 is arranged to form a first shoulder 31. The first shoulder 31 is intended to directly abut against one of the ends 7 of the stator 2.

The annular rib 30 is also arranged to form a bearing surface 32. The bearing surface 32 is designed to come in direct abutment against an inner wall of the central bore 6.

Thus, each bearing 21 is in direct axial abutment, on the one hand, and in direct radial abutment, on the other hand, against the stator 2. These direct abutments reduce the tolerance stack-up between the rotor 3 and the stator 2. They therefore allow a better centering of the rotor 3 in the central bore 6. This limits the noise problems caused by the eccentricity of the rotor 3 and the stator 2.

The inner wall 28 includes a shoulder 34. Each rolling 22 is adapted to come close to or in abutment against the corresponding shoulder 34. In principle, a clearance is left during assembly between the rolling and the shoulder to avoid the risk of damaging the rolling during stressing as well as during a possible fall of the actuator. The shoulder 34 is oriented outwards, i.e. opposite to the stator 2, so that the rolling assembly 22 is performed after the bearing 21 assembly.

The shoulder 34 marks the boundary of a first section 36 and a second section 37 of bearing 21. The inner diameter of the first section 36 is greater than the inner diameter of the second section 37 so that the rotor 3 extends partially into the first section 36 of each bearing 21. Said boundaries help to ensure the rigidity of the bearing 21 while housing the end of the rotor 3.

The motor 1 may include an electrically insulating element 39, as can be seen for example in FIGS. 10 to 13. The electrically insulating element 39 is intended to cover the outer wall 27 of each bearing 21 to prevent electrical contact likely to cause a short circuit between a coil end and an electrically conductive element of the motor 1. Electrical safety can be achieved by the element 39.

As shown in FIG. 12, the outer wall 27 of the bearing 21 may comprise a second shoulder 41, also formed by the annular rib 30, and a third shoulder 42, formed by a flange 43. The electrically insulating element 39 is shaped to cooperate with the second shoulder 41 and the third shoulder 42. The second shoulder 41 and the third shoulder 42 are used to position and axially maintain in position the electrically insulating element 39.

The electrically insulating element 39 may be overmolded. It preferably covers the annular rib 30 and the flange 43, as seen in FIGS. 10 to 13.

To block the rolling 22 within each bearing 21, the motor 1 may include a support element 44 secured to one end of the rotor shaft 4, and biasing means, such as a prestressed spring 45 abutting against the element 44 and tending to push the rolling 22 towards the shoulder 34. At another end of the rotor shaft 4, a driver 46, adapted to cooperate with a gear (not shown), can be tightly mounted on the shaft 4, optionally abutting against the corresponding rolling 22.

The assembly of the induction motor 1 is described below.

According to a first possibility, it comprises beforehand installing the bowls 9 against each end 7 of the stator 2 in order to protect the coil ends by housing them in the space 14 defined between the outer skirt 12 and the inner skirt 13 of each bowl 9. At this stage, the inner skirts 13 are not deformed. The space 14 has thus a maximum aperture which makes it possible to safely insert the coil ends.

It subsequently comprises installing the means to support the rotor assembly, to one side of the stator 2. A bearing 21 is then inserted into the corresponding bowl 9, advantageously by pressing it directly against the stator 2. The installation of the bearing 21 causes a gradual deformation of the inner skirt 13 in which it is inserted. At contact with the inner skirt 13, the coil end is carefully pushed back but remains protected from the bearing 21. The bearing 21 is inserted until the first shoulder 31 and the bearing surface 32 abut against the stator 2. This step also includes, in the embodiment shown in FIG. 1, inserting a rolling 22 in the bearing 21 and driving this rolling 22 towards the shoulder 34. It has to be noted that the bearing 21 and the rolling 22 are inserted from the outside inwards, i.e. in the direction of the stator 2.

It remains to restrain said rolling 22 to hold it pressed in the direction of the shoulder 34, install on the rotor 3 the support means to be arranged on the other side of the stator 2, and then insert the rotor 3 on which a bearing 21 has been placed in the other bowl 9 and the central bore 6 of the stator 2. During this insertion, the bearing 21 previously arranged on the rotor 3 pushes the tabs 25 of the inner skirt 13 of said other bowl 9. Said bearing 21 is, like the previous one, in direct axial and radial abutment against the stator 2.

According to a second preferred possibility, the assembly may comprise the steps below.

In one step, two first subassemblies can be achieved by assembling each rolling 22 in the corresponding bearing 21. This step can be implemented on the same workstation, as the bearings 21 may be identical. Such workstation can be separated from the workstation(s) used to implement the other steps of the assembly.

In another step, a second subassembly is formed by assembling the rotor assembly (rotor 3 and shaft 4), of one of the first two subassemblies formed by assembling one of the rollings 22 in one of the bearings 21, and possibly the driver 46, placed in abutment against the rolling 22. These parts (rotor assembly, rolling 22 preassembled to the bearing 21, and optionally the driver 46) can be driven.

In a further step, a third subassembly is formed by assembling the two bowls 9 of the stator 2 (a bowl 9 at each end of the stator 2).

In yet another step, the second subassembly (rotor assembly, the rolling 22 preassembled to the bearing 21, and optionally the driver 46), the third subassembly (stator 2 assembled to the two bowls 9), and the remaining first subassembly (rolling 22 assembled to the bearing 21) are assembled to each other. Said assembly may be accomplished by driving, during a same operation. Note also that, to implement this step, the corresponding workstation may include a guide pin intended for positioning in a housing 47 formed on the axis 4 of the rotor 3. This prevents misalignment of the axis of the rotor with the center of rolling.

In a last step, the spring 45 may be installed, in abutment against one of the rollings 22 (where appropriate other than that rolling against which the driver 46 abuts) to axially prestress (according axis 4) the assembly thus formed.

The spring 45 can achieve sufficient axial abutment to prevent excessive clearances from causing noise during operation. However, the push-in can further reduce existing clearances.

Although it is more complex than the one previously described, this method is more economical, because the bearings 21 are driven simultaneously (push-in in a single operation of the second subassembly, the third subassembly and the remaining first subassembly).

Of course, the invention is not limited to the embodiment described above, this embodiment having been given as an example. Modifications remain possible, particularly in terms of the construction of the various elements or by substitution of technical equivalents, without thereby departing from the scope of protection of the invention.

The invention claimed is:

1. An induction motor, adapted to be housed in the hollow body of a substantially longitudinal actuator used to roll up and down cloths, screens, blinds or roller shutters, wherein the motor comprises:
   (i) a stator,
   (ii) a rotor assembly,
   (iii) a bowl, capable of protecting a coil end formed at one end of the stator, the bowl comprising an inner skirt,
   (iv) a supporting component permitting rotation of the rotor assembly relative to the stator, the supporting component comprising a bearing disposed within the inner skirt, the bearing comprising a zone of a dual axial and radial abutment against the stator, wherein the supporting component comprises a rolling disposed within the bearing and the bearing includes an inner wall with a shoulder directed outwards, i.e. the opposite side facing the stator, the rolling abutting against a surface of the shoulder directed outwardly, such that the bearing and the rolling are adapted to be inserted from the outside inwardly, in the direction of the stator.

2. The induction motor according to claim 1, wherein the bearing comprises an outer wall and in that the zone of dual abutment is formed by the end of the outer wall of the bearing and a side of an annular rib located on the outer wall.

3. The induction motor according to claim 2, wherein the annular rib forms a first shoulder shaped to axially abut against the stator and defines a bearing surface shaped to radially abut against the stator.

4. The induction motor according to claim 1, further comprising a restraining component configured for restraining the rolling toward the shoulder.

5. The induction motor according to claim 4, wherein the restraining component comprises a support element integral with a rotor shaft and biasing means tending to press the rolling against the shoulder.

6. The induction motor according to claim 1, wherein the rotor assembly comprises a rotor extending at least partially inside the bearing.

7. The induction motor according to claim 1, further comprising an electrically insulating element, interposed between the bearing and the inner skirt.

8. The induction motor according to claim 7, wherein the bearing comprises an outer wall covered by the electrically insulating element, and comprising a second shoulder and a third shoulder opposite to each other, against which the electrically insulating element abuts in order to secure it axially relative to bearing.

9. The induction motor according to claim 1, wherein the electrically insulating element is over-molded onto the bearing.

10. The induction motor according to claim 1, wherein the motor comprises a similar second bearing and in that the two bearings are arranged symmetrically in the motor.

11. The induction motor according to claim 1, wherein the bowl comprises an outer skirt shaped to match the shape of the inner wall of the hollow body of the longitudinal actuator, the outer skirt having an edge intended to abut against one of the ends of the stator, the edge comprising a plurality of legs extending in the extension of the outer skirt and each housed in a recess formed on the outer circumference of the stator, so that the bowl is adapted to center the stator in the hollow body of the substantially longitudinal actuator.

12. A method of assembling an induction motor according to claim 1, comprising:
assembling two rollings in two bearings to form two corresponding first subassemblies each formed of one of the rollings and one of the bearing,
assembling one said first subassemblies with the rotor assembly, and optionally with a driver arranged to abut against the rolling of the first subassembly, to form a second subassembly,
assembling the two bowls on the stator, each bowl being arranged in abutment against one end of the stator to form a third subassembly,
assembling the third subassembly with the second subassembly and the remaining first subassembly,
axially prestressing the assembly thus formed.

13. The method of assembling the induction motor according to claim 12, wherein the rotor assembly, one of the first subassemblies, and optionally the driver are driven to form the second subassembly, and wherein the assembly of the third subassembly, the second subassembly and the remaining first subassembly is also performed by a simultaneous push-in operation.

* * * * *